July 26, 1960

W. R. WOOTTON 2,946,732

NUCLEAR POWER PLANT

Filed Nov. 6, 1956

Inventor
William R. Wootton
By
Pennie, Edmonds, Morton, Barrows & Taylor
Attorneys.

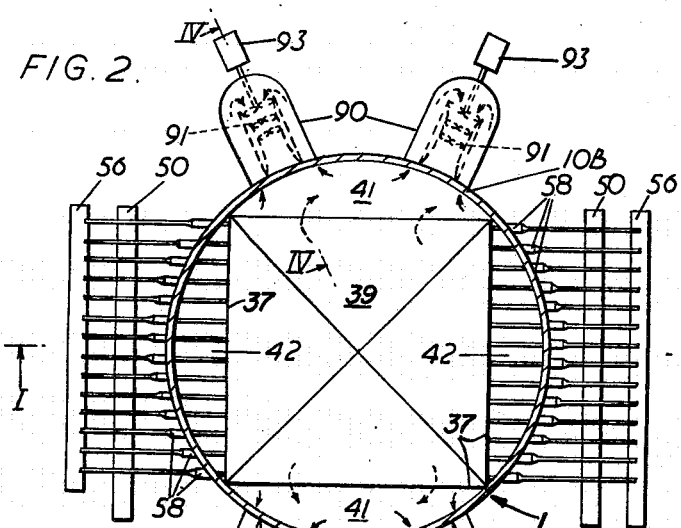
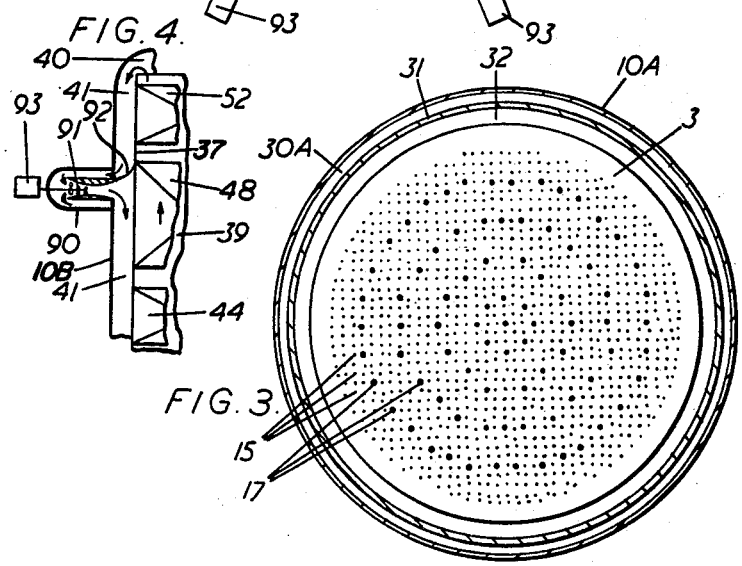

July 26, 1960

W. R. WOOTTON 2,946,732

NUCLEAR POWER PLANT

Filed Nov. 6, 1956

Inventor
William R. Wootton
By
Pennie, Edmonds, Morton, Barrows & Taylor
Attorneys July 26, 1960

W. R. WOOTTON 2,946,732

NUCLEAR POWER PLANT

Filed Nov. 6, 1956

Inventor
William R. Wootton
By
Pennie, Edmonds, Morton, Barrows & Taylor
Attorneys

United States Patent Office 2,946,732
Patented July 26, 1960

2,946,732
NUCLEAR POWER PLANT

William R. Wootton, London, England, assignor to Babcock & Wilcox Limited, London, England, a British company Filed Nov. 6, 1956, Ser. No. 620,714

Claims priority, application Great Britain Nov. 11, 1955

11 Claims. (Cl. 204—193.2)

This invention relates to vapour generators of the kind having a nuclear reactor and provision for circulating in a closed circuit a gaseous coolant in heat exchange relationship with the nuclear reactor and through a heat exchanger. At the present time a vapour generator of the kind specified for a central power station comprises a reactor shell containing the reactor and a plurality of vessels each containing a heat exchanger for the generation of vapour and interconnected with the reactor shell by ducting for the circulation of the coolant, the ducting being provided with shut-off valves and with expansion joints necessary to accommodate the considerable thermal expansion and contraction of the ducting which occurs in service. The reactor shell is supported on a seat of such design as to permit expansion and contraction of the shell while ensuring a substantially horizontal base and is surrounded by a thick concrete wall serving as a biological shield, whilst the heat exchanger vessels, supported on skirt bases or suitable support brackets and provided with access ladders and galleries are distributed around the building housing the reactor shell. As a result, the area occupied by the vapour generating section of the power station is considerable and the cost of buildings, structures and components is high, whilst extensive site welding of the ducting introduces leakage hazards.

An object of the present invention is the provision of a cheaper construction of vapour generator for a nuclear power plant. Another object is the provision of a construction in which the hazard of leakage of radio-active substances is substantially reduced. Further objects and advantages of the invention will be apparent from the subsequent description of embodiments of the invention.

The invention will now be described, by way of example, with reference to the accompanying partly diagrammatic drawings, in which:

Figure 2 is a sectional plan view taken on the line II—II of Figure 1;

Figure 3 is a sectional plan view of a pressure vessel shown in Figure 1, taken on the line III—III of that figure;

Figure 4 is a sectional elevation of part of a pressure vessel shown in Figure 2, taken on the line IV—IV of that figure and as viewed in the direction of the arrows;

Figure 1:
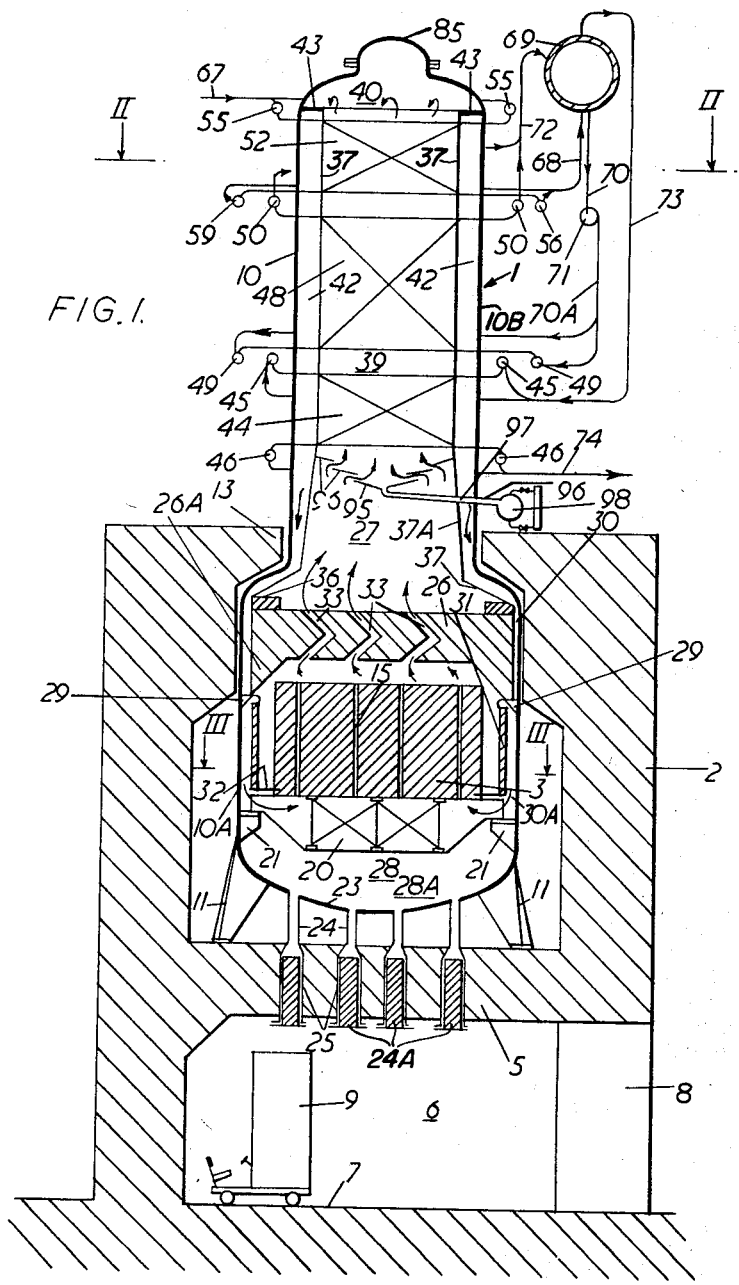
Figure 1 is a sectional side elevation of a vapour generating installation taken on the line I—I of Figure 2 and as viewed in the direction indicated by the arrows.

Referring first to the embodiment of the invention illustrated in Figures 1 to 4 of the accompanying drawings, the complete vapour generator 1 is supported by a massive concrete structure 2 part of which serves as a biological shield for a nuclear reactor 3 which is the source of heat for the vapour generator.

The concrete structure 2 is in the form of an upright hollow cylinder provided with a thick transverse floor 5 covered with steel plates, the part of the cylinder below the floor 5 constituting a fuel element handling room 6 provided with a floor 7 and with a side entry 8 for the passage of a fuel element handling vehicle 9. Vehicle 9 is of known type containing a rotary fuel element magazine having a vertical axis and is provided with means for raising the fuel elements into a desired operating position.

The vapour generator 1 includes a vertically extending pressure vessel 10 which is for the most part of circular cross section and the lower part 10A of which is of larger diameter than the coaxial upper part 10B. The lower part 10A is provided with legs 11 which rest upon the floor 5 and transmit the whole weight of the vapour generator 1 to the structure 2.

An upper part of the structure 2, at a level above the lower part 10A of the pressure vessel, extends inwardly towards the upper part 10B of the pressure vessel to provide an inward extension 13 of the biological shield, while the part of the structure 2 which lies about the upper end of the lower part 10 extends inwardly into close proximity to the nuclear reactor 3 to provide a thickening of the biological shield in the region of maximum radiation from the reactor. The inward extension 13 is so fabricated that it may be removed in sections to render it possible for the pressure vessel 10 to be lifted out of the structure 2.

The nuclear reactor 3, which is of the graphite moderated, gas cooled, natural uranium type, is formed with a large number of vertical holes 15 (see Figure 3) in which are disposed nuclear fuel elements in such a manner as to leave annular gas flow passages thereabout and is formed with other vertical holes 17 in which may be inserted neutron absorbing control rods. The reactor 3 is supported on a suitable grillage 20 mounted on brackets 21 welded to the wall of the pressure vessel part 10A. The floor 23 of the pressure vessel 10 is provided with nozzles 24 which are aligned with holes 25 in the concrete floor 5, through which the fuel elements may be replaced by an operator using the handling vehicle 9. The nozzles 24 are provided with suitable gas-tight closure means including plugs 24A which when in place complete the biological shielding. Other nozzles, not detailed, permit the adjustment of the control rods.

The nuclear reactor 3 is disposed some distance below the upper part 10B of the pressure vessel and a biological shield 26 is arranged inside the part 10A above the reactor, the shield 26 serving to separate the pressure vessel into upper and lower chambers 27 and 28 respectively. This shield is built up from hollow steel blocks that have been filled with concrete and has a downward peripheral skirt 26A which lies in the direction of maximum radiation from the reactor; the weight of the shield 26 being supported through the skirt 26A on brackets 29 welded to the inside of the pressure vessel part 10A. An annular gas flow space 30 is left between the periphery of the shield 26 and the inner surface of the pressure vessel and an annular downward continuation 30A of the gas flow space 30 is bounded on the inner side by an annular, steel cased, heat insulating pendant apron 31 suspended at its upper end from the brackets 29, adjacent which it is secured in a gas tight manner to the biological shield 26. The lower end of the apron 31 is connected in a gas tight manner to the lower periphery of the reactor 3 by horizontally arranged, flexible plates 32 which flex upon unequal thermal expansions of the parts of the vapour generator. At its lower end the downward continuation 30A of the gas space 30 is in communication with a part 28A of the gas chamber 39 which lies below the reactor 3.

The biological shield 26 is formed with gas channels 33 which appear of chevron form, when viewed as in Figure 1, this shape ensuring effective screening of the upper chamber 27 of the pressure vessel 1 from the nuclear reactor and on the other hand permitting the flow of the coolant gas with but a relatively small pressure drop. The shield 26 is sectionalised to permit its section-by-section withdrawal through the upper chamber 27.

The biological shield 26 is provided about its upper periphery with a sectionalised shield ring 36 the joints in which are offset from those in the shield 26 to ensure that no radiation from the reactor penetrates into the upper chamber 27. From this shield ring 36 a sheet metal baffle 37 extends upwardly through the chamber 27 coaxially with the pressure vessel part 10B, the horizontal cross section of the baffle changing over a part 37A from a circle at the lower end to a square which at its corners abuts the pressure vessel. The baffle 37 encloses a central gas pass 39, and the upper end of the baffle is spaced from the upper end of the vessel part 10B to leave a space 40 for the flow of gases from the pass 39 into two segmental passages 41 (see Figure 2) which lie between the baffle and the pressure vessel. The remaining two segmental spaces 42 are closed at their upper ends by plates 43. The baffle is provided with suitable expansion joints adapted to accommodate differential thermal expansion between the pressure vessel, the baffle 37 and the biological shield 26, and at the corners of the gas pass 39 is held in place by the wall of the pressure vessel 10.

Disposed within a lower part of the gas pass 39 is a tubulous convection superheater 44 consisting of a bank of tubes each connected at an upper end to one of two inlet headers 45, extending as a number of superimposed straight tube lengths, connected in series by return bends, to and fro across the gas pass 39, and connected at its lower end to one of two outlet headers 46.

Disposed within the gas pass 39 above the superheater 44 is a tubulous vapour generating section 48 consisting of a bank of tubes each connected at its lower end to one of two inlet headers 49, extending as a number of superimposed straight tube lengths, connected in series by return bends, to and fro across the gas pass 39, and connected at its upper end to one of two outlet headers 50.

Disposed within an upper part of the gas pass 39 is an economiser 52 consisting of a bank of tubes each connected at its upper end to one of two inlet headers 55, extending as a number of superimposed straight tube lengths, connected in series by return bends, to and fro across the gas pass 39, and connected at its lower end to one of two outlet headers 56.

The end parts of all these heat exchanger tubes pass by way of suitable thermal sleeves, such as the sleeves 58 (indicated in Figure 2 only), through the pressure vessel wall.

A feed water pipe 67 is connected to the economiser inlet headers 55, transfer pipes 68 connect the economiser outlet headers 56 to the water space of a steam and water drum 69 which is disposed above the level of the economiser, the water space of the drum is connected by pipe 70, a forced circulation pump 71 and pipes 70A to the inlet headers 49 of the vapour generating section 48, the outlet headers 50 of which are connected by pipes 72 to the steam space of the drum. Pipes 73 connect the steam space of the drum to the inlet headers 45 of the superheater and pipes 74 connect the superheater outlet header 46 to a steam main leading to the point of use of the superheated steam.

The top end of the pressure vessel 10 is closed by a cover plate 85, which may be removed to permit access for inspection and repair to the part of the pressure vessel above the biological shield 26.

The upper part 10B of the pressure vessel 10 is provided with four lateral protuberances 90 (see Figures 2 and 4) each of which contains an axial flow fan 91 for effecting circulation of the gaseous coolant, carbon dioxide, for the nuclear reactor. The protuberances 90 are provided at a common level and towards the top of the pressure vessel, a baffle 92 (Figure 4) being provided in each of the two passages 41 adjacent the fans 91 for directing the gaseous coolant from the upper part of the gas passage 41 above the fans to the outer end of the protuberances, near which are disposed the intakes for the fans; the fans discharge into the part of the gas passage 41 which is below the fan. Each fan is driven by its own individual electric motor 93 which is disposed outside the pressure vessel and is suitably coupled to the fan rotor.

Below the superheater 44 is disposed a central condensate collecting tray 95 above which are disposed two concentric, vertically spaced, annular, downwardly dished, overlapping baffles 96 which effectively intercept condensate drips falling in the gas pass 39 from any part of the heat exchange surfaces and the inside of the baffle wall and yet which permit the upward flow of gases from below the tray and baffles into the part of the gas pass containing the heat exchange surfaces. The lowest point in the tray 95 is connected by a drainage pipe 97 to a collecting header 98 disposed outside the pressure vessel and from which the condensate may be tapped off as and when desired.

The space within the pressure vessel 10 is filled with the gaseous coolant, carbon dioxide, under a suitable pressure, for example a pressure of 150 pounds per square inch under static conditions when the reactor is non-critical and the gas temperature is 20° C. When the nuclear reactor 3 is rendered critical, by movement of the control rods, heat is continuously generated therein. Whenever the reactor is critical the motors 93 driving the fans 91 are energised so that coolant gas is pumped by the fans 91 downwardly through the segmental passages 41 (see Figures 2 and 4) which lie between the baffle 37 and the pressure vessel 10, flowing downwardly through the annular flow space 30 (see Figure 1) into the annular downward continuation 30A of that gas flow space. This gas flows into the lower chamber 28 from which it flows upwardly between the members of the grillage 20, entering the lower ends of the vertical holes 15. In the holes 15 it flows through the annular gas flow passages about the nuclear fuel elements, absorbing heat from those elements. Upon leaving the upper ends of the holes 15, the various streams of heated gases combine and mix and then flow upwardly through the cranked gas channels 33 into the upper chamber 27. From chamber 27 the gas flows through the gaps between the vertically spaced, annular, overlapping baffles 96 and tray 95 and enters the part of the gas pass 39 which lies above those baffles and which contains the heat exchange surfaces. The gas passes upwardly over the heat exchange surfaces of the superheater 44, the vapour generating section 48 and the economiser 52, the cooled gases passing out through the open end of pass 39 into the space 40 and there turning to pass down through the upper parts of the passages 41 to the inlets of the fans 91. There is no gas flow through the two segmental spaces 42 since these are blanked off at their upper ends by the plates 43 and since the baffle 37 contacts the pressure vessel 10 at the corners of the rectangular gas pass 39.

During operation of the vapour generator described above, feed water is fed under pressure through the pipe 67 into the economiser 52 from which a steam-water mixture is discharged through pipes 68 into the drum 69, water is fed from the drum 69 through pipes 70 and 70A by the pump 71 to the vapour generating section 48 from which a steam-water mixture is discharged through pipes 72 to the steam space of drum 69, and steam is fed from the steam space of the drum through pipes 73 and the superheater 44 to pipes 74 and passes to the point of use of the superheated steam.

Heat generated in the reactor 3 is transferred to the gaseous coolant, and then is transferred from the gaseous coolant to the heat exchange surfaces in the pass 39.

When the vapour generator is relatively cold, for example when starting up the reactor from cold, there may be a tendency for moisture to condense from the gaseous coolant upon the cold metallic surfaces of the heat exchangers. Any such condensate will be intercepted by the baffles 96 and the tray 95 and drained off from the pressure vessel into header 98. Besides avoiding the possibility of contamination of the reactor core by condensate from the heat exchangers, the condensate collecting means ensure that, in the unlikely event of leakage from the vapour generating tubes, the liquid leaking from the tubes is discharged to the collector header without impeding the circulation of coolant through the reactor. Any condensate which forms upon the inside surface of the pressure vessel will drain into the bottom where suitable drainage means are provided.

From the above description it will be understood that the vapour generator described is of a compact construction, the use of external ducting from the gaseous coolant is avoided and access may safely be had to the heat exchanger for the purpose of inspection or repair. Since the fans effect a flow of coolant downwardly in spaces between the baffling means and the pressure vessel wall after flowing upwardly from the nuclear reactor through the heat exchangers, the walls of the pressure vessel are subjected to contact with gaseous coolant of only moderate temperature.

Figures 5, 6:
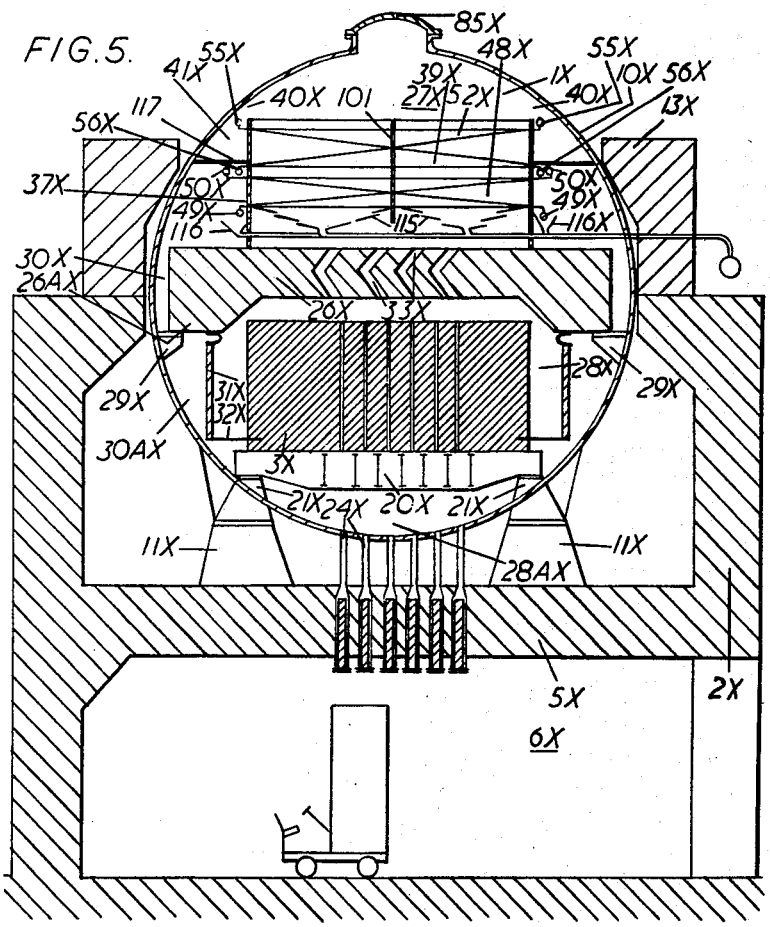
Figure 5 is a sectional side elevation of an alternative form of vapour generating installation, taken on the line V—V of Figure 6 and as viewed in the direction indicated by the arrows in that figure.
Figure 6 is a plan view of the installation shown in Figure 5.

Figures 5 and 6 illustrate an alternative form of vapour generator in which the pressure vessel is made of spherical shape. A spherical pressure vessel gives the maximum cubic content for a given expanse of wall surface, and for technical reasons this is important.

Certain alternations in the form and the disposition of the parts of the vapour generator are necessary to allow for the change in the shape of the pressure vessel, but many of the parts in the embodiment of Figures 5 and 6 correspond to similar parts in the embodiments of Figures 1 to 4, and such corresponding parts are denoted by the reference numerals used in the first embodiment with the suffix "X."

Thus concrete structure 2X has a floor 5X above a fuel element handling room 6X and the vapour generator 1X includes a spherical pressure vessel 10X provided with legs 11X by which it is supported on the floor 5X. An upper part 13X of the structure 2X extends inwardly about the upper surface of the pressure vessel, this part 13X being sectionalised in order that it may be removed and the pressure vessel lifted bodily from the structure 2X. A nuclear reactor 3X is positioned in the lower part of the vessel 10X and is supported on a grillage 20X mounted on brackets 21X welded to the pressure vessel. Nozzles 24X provide for the replacement of spent fuel elements.

A biological shield 26X is arranged inside the pressure vessel above the reactor 3X and serves to separate the pressure vessel into upper and lower chambers 27X and 28X respectively, the shield 26X being formed with a downwardly extending peripheral skirt 26AX and being supported through the skirt on brackets 29X welded to the inside of the pressure vessel. An annular gas flow space 30X is left between the periphery of the shield 26X and the inner surface of the pressure vessel and an annular downward continuation 30AX of the gas flow space 30X is bounded on its inner side by a pendant apron 31X suspended at its upper end from, and secured in a gas tight manner to, the shield 26X. The lower end of the apron 31X is connected in a gas tight manner to the lower periphery of the reactor by horizontal plates 32X. The part 28AX of the gas chamber 28X which lies below the reactor 3X is in communication with the lower end of the continuation 30AX of gas space 30X.

Gas channels 33X of chevron form are formed in the shield 26X, which is sectionalised for ready removal. From the top surface of the shield 26X a sheet metal baffle 37X extends upwardly into the chamber 27X, the horizontal cross-section of the baffle being square and the baffle enclosing a central gas pass 39X. The upper end of the baffle is spaced from the curved upper wall of the vessel to leave a space 40X for the flow of gases from the pass 39X into the upper ends of four segmental passages 41X which lie between the baffle 37X and the wall of the pressure vessel.

The vapour generator 1X is of the once-through type supplying a separately fired final superheater. A feed water pump (not shown) is connected to the inlet headers 55X of an economiser 52X disposed within an upper part of the gas pass 39X and consisting of a bank of tubes each connected at its upper end to one of the two inlet headers, extending as a number of superimposed straight tube lengths, connected in series by return bends, to and fro across the gas pass 39X and connected at its lower end to one of two outlet headers 56X.

Disposed in a lower part of the gas pass 39X is a tubulous vapour generating section 48X consisting of a bank of tubes each connected at its lower end to one of two inlet headers 49X, extending as a number of superimposed straight tube lengths, connected in series by return bends, to and fro across the gas pass 39X, and connected at its upper end to one of two outlet headers 50X. The economiser outlet headers 56X are suitably connected to the inlet headers 49X.

As a result of the use of a spherical pressure vessel, the span of the heat exchanger tubes is large, and a tube support 101 is provided, suitably mounted on the biological shield 26X and supporting the economiser tubes and the vapour generating tubes at about their mid-span point.

A steam main (not shown) connects the outlet headers 50X to the separately fired final superheater (not shown), which is disposed outside the pressure vessel and is heated by gases from an oil fired furnace, the outlet headers of the superheater being connected by a second steam main to the point of use of the steam.

The top end of the pressure vessel 10X is closed by a cover plate 85X, and condensate collecting means 115 are provided, similar to the condensate collecting means of Figure 1, but in duplicated form and with the additional of drip-collecting hoppers 116 disposed beneath the headers 49X, 50X and 56X and arranged to discharge condensate to a separate vessel (not shown) outside the pressure vessel.

The pressure vessel 10X is provided with two lateral protuberances 90X (see Figure 6) containing fans arranged for the recirculation of cooled coolant from the upper part of the chamber 27X to the lower part 28AX of the chamber 28X. A horizontal partition 117 extends between the baffle 37X and the inner surface of the pressure vessel 10X to separate the upper parts of the four gas passages 41X from the lower parts of those passages, and the fans have their inlets connected to the gas passage parts above the partition 117 and their outlets connected to the gas passage parts below the partition. Suitable drainage means are provided for the extraction of condensate collecting on the partition 117.

As in the preceding embodiment, the coolant used is carbon dioxide, and the operation of the vapour generator is in all respects similar to that embodiment, with the one exception that the final superheating of the steam formed in, and partially superheated in, the vapour generating section 48X is effected in the separately fired final superheater before the steam passes to the point of use.

In each of the embodiments so far described the main part of the biological shield has been disposed outside the pressure vessel 10 or 10X. It has been found that, on a basis of present day costs, an economic advantage is to be obtained if the whole of the biological shield is put inside the pressure vessel. For a given size of reactor and vapour generator, the size and cost of the pressure vessel required is increased; on the other hand, the amount and cost of concrete required for the biological shield is very much reduced; and even after allowance is made for the fact that the concrete shield, when inside the pressure vessel and in contact with the gaseous coolant, needs to be in the form of concrete filled hollow steel blocks, the complete installation is found to be cheaper when all the shield is inside the pressure vessel.

Figure 7:
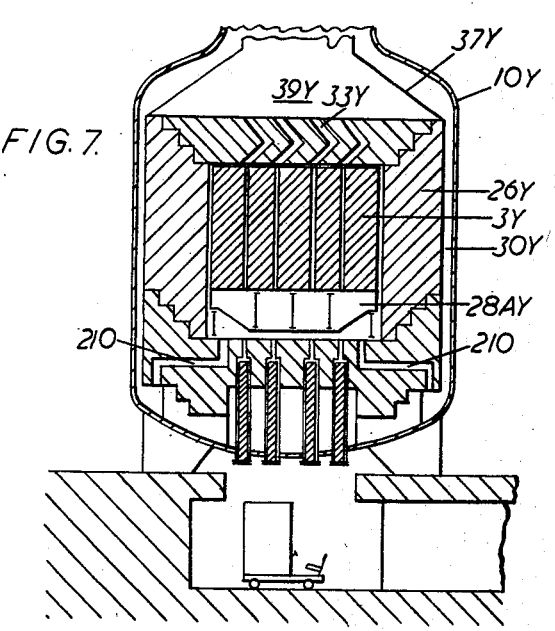
Figure 7 is a sectional side elevation of the lower part only of a third form of vapour generating installation.

Figure 7 illustrates a construction similar to that of Figure 1 but in which all the biological shield 26Y is inside the pressure vessel 10Y, the baffle 37Y which bounds the central gas pass 39Y extending downwardly as far as the periphery of the top of the reactor 3Y and an annular passage 30Y between the side walls of the shield and the wall of the pressure vessel providing for the downward flow of cooled coolant gas to gas passages 210 through which the gases may pass to the chamber 28AY below the reactor before passing upwardly through the reactor. As in the other embodiments, gas channels 33Y of chevron form are formed in the biological shield to permit the flow of coolant gas from above the reactor into the lower end of the gas pass 39Y, and the upper parts of the biological shield are sectionalised so that they may be dismantled and removed through the upper part of the pressure vessel (not shown). The joints between the sections of the shield are suitably staggered in order to avoid neutron leakage through the shield.

Figure 8:
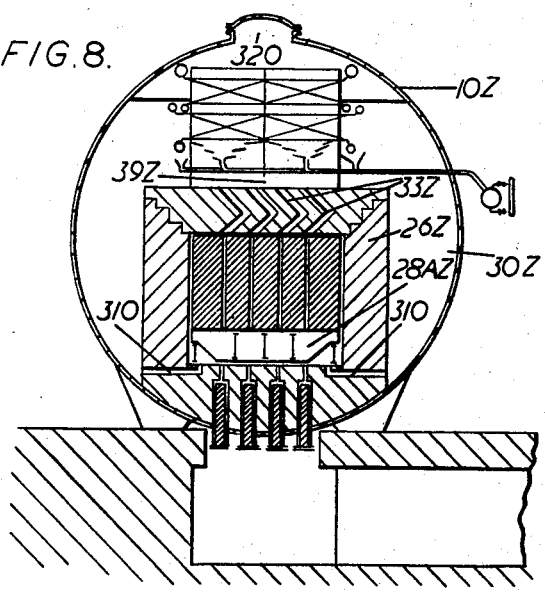
Figure 8 is a sectional side elevation of a fourth form of vapour generating installation.

Figure 8 illustrates a construction similar to that of Figure 5 but in which all the biological shield 26Z is inside the pressure vessel 10Z. An annular passage 30Z between the side walls of the shield and the wall of the pressure vessel provides for the downward flow of cooled coolant gas to gas passages 310 through which the gases may pass to the chamber 28AZ below the reactor before passing upwardly through the reactor. As in the other embodiments, gas channels 33Z of chevron form are provided in the biological shield to permit the flow of coolant from above the reactor into the lower end of the gas pass 39Z, and the upper parts of the biological shield are sectionalised so that they may be dismantled and removed through an access opening 320 provided in the upper part of the pressure vessel. The joints between the sections of the shield are suitably staggered in order to avoid neutron leakage through the shield.

In each of the embodiments of the invention described above, the arrangement has been such that the holes through the reactor which contain the fuel elements and the control rods extend vertically. If desired, these holes may extend into the reactor from one or more sides, the fuel element handling room then being disposed at the side of the reactor.

If desired, the pressure vessel may be sectionalised in order to permit or facilitate shop assembly of the heat exchanger in relation to the pressure vessel.

What I claim is:

1. Nuclear power plant comprising a single pressure vessel, a biological shield, a section of which is disposed inside the pressure vessel separating the interior of the pressure vessel into two chambers, a heterogeneous nuclear reactor of the natural uranium, graphite-moderated, gas coolant type which operates with a recycled gaseous coolant under super-atmospheric pressure arranged in one of said chambers of the pressure vessel, a steam generator including a heat exchanger arranged in the other of said chambers of the pressure vessel, the section of the biological shield in the pressure chamber being so formed as to permit the flow therethrough of gaseous coolant and to prevent direct radiation from the nuclear reactor to the heat exchanger, baffle means disposed wholly within the pressure vessel and arranged to direct heated coolant gas from the reactor to the heat exchanger and cooled coolant gas from the heat exchanger to the reactor, and fan means within the pressure vessel arranged to promote the flow of heated coolant gas from the reactor to the heat exchanger and cooled coolant gas from the heat exchanger to the reactor, the pressure vessel being subjected internally under normal operation of the plant to the full pressure of the gaseous coolant, whereby the baffle means are subjected only to the small pressure differences required to insure flow of gaseous coolant.

2. Nuclear power plant according to claim 1, wherein substantially the whole of the biological shield is disposed inside the pressure vessel.

3. Nuclear power plant according to claim 1, wherein a section of the biological shield is disposed outside the pressure vessel, is arranged to surround the chamber which contains the nuclear reactor and is arranged to overlap the biological shield arranged inside the pressure vessel.

4. Nuclear power plant according to claim 3, wherein the pressure vessel includes a part of reduced cross-section adjacent the internal section of the biological shield on the side of that shield section remote from the reactor, and the external section of the biological shield includes a part which fits about the said part of the pressure vessel so as to overlap the internal biological shield.

5. Nuclear power plant according to claim 4, wherein the part of the external biological shield which fits about the part of the pressure vessel of reduced cross-section is sectionalised for ready removal to permit bodily removal of the pressure vessel from the external section of the biological shield.

6. Nuclear power plant according to claim 1, wherein a lower chamber within the pressure vessel contains the nuclear reactor which is surrounded by the biological shield including an external section outside the pressure vessel and an internal section which is disposed within the pressure vessel between the lower chamber and an upper chamber containing the heat exchanger, the section of the shield within the vessel being formed to permit the flow therethrough of the gaseous coolant whilst preventing direct radiation from the nuclear reactor to the upper chamber.

7. Nuclear power plant according to claim 6, wherein the chambers are of circular horizontal cross-section and the upper chamber is of lesser diameter than the part of the vessel which contains the internal section of the shield and the section of the shield outside the pressure vessel is formed with an annular, inwardly extending arch overhanging a peripheral portion of the internal section of the shield.

8. Nuclear power plant according to claim 6, wherein provision is made for charging fuel elements to and discharging fuel elements from the nuclear reactor through the bottom of the pressure vessel and below the biological shield is a fuel element charging and discharging room.

9. Nuclear power plant according to claim 6, wherein the heat exchanger is contained within baffling means which afford an internal flow path leading upwardly away from the nuclear reactor and an external flow path between the baffling means the inner surface of the pressure vessel leading downwardly towards the nuclear reactor, and beyond the baffling means the external flow path is extended between the internal part of the biological shield and the inner surface of the pressure vessel and between a baffle surrounding the nuclear reactor and the inner surface of the pressure vessel to a space below the nuclear reactor.

10. Nuclear power plant according to claim 9, wherein the baffle surrounding the nuclear reactor is of metal-clad heat insulating material.

11. Nuclear power plant according to claim 6, wherein at the top of the pressure vessel and closed by a removable cover plate is an opening enabling removal and replacement of parts of the nuclear reactor not otherwise withdrawable and removal and replacement of parts of the heat exchanger.

References Cited in the file of this patent

UNITED STATES PATENTS

| | | |
|---|---|---|
| 2,744,064 | Moore | May 1, 1956 |
| 2,787,593 | Metcalf | Apr. 2, 1957 |
| 2,809,931 | Daniels | Oct. 15, 1957 |
| 2,812,303 | Daniels | Nov. 5, 1957 |
| 2,825,688 | Vernon | Mar. 4, 1958 |
| 2,841,545 | Zinn | July 1, 1958 |

FOREIGN PATENTS

| | | |
|---|---|---|
| 753,130 | Great Britain | July 18, 1956 |

OTHER REFERENCES

U.S. Atomic Energy Commission CF-53-1-140 dated January 14, 1953, pages 1-3, 17-19. (Operation of Boiling Reactors.) Copy available from AEC Technical Information Service, Oak Ridge, Tenn.

Nucleonics, November 1955, pages 72-74.

U.S. Atomic Energy Commission AECD-3731, Army Package Power Reactor, October 14, 1955, pages 32, 33, 47, 48.